J. B. BAILEY.
APPARATUS FOR COOKING FRUITS AND VEGETABLES.
APPLICATION FILED OCT. 22, 1912.
1,085,521.
Patented Jan. 27, 1914.
2 SHEETS—SHEET 2.
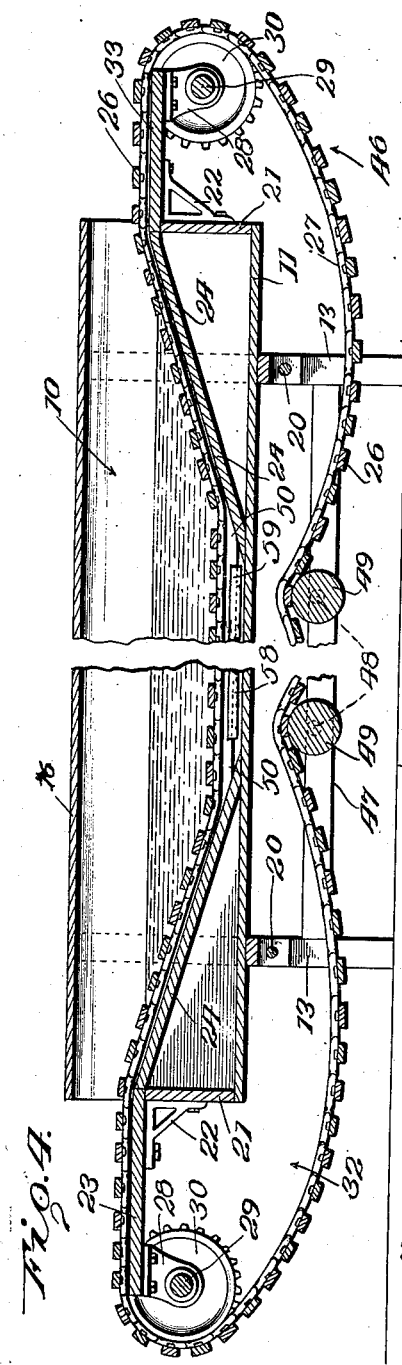
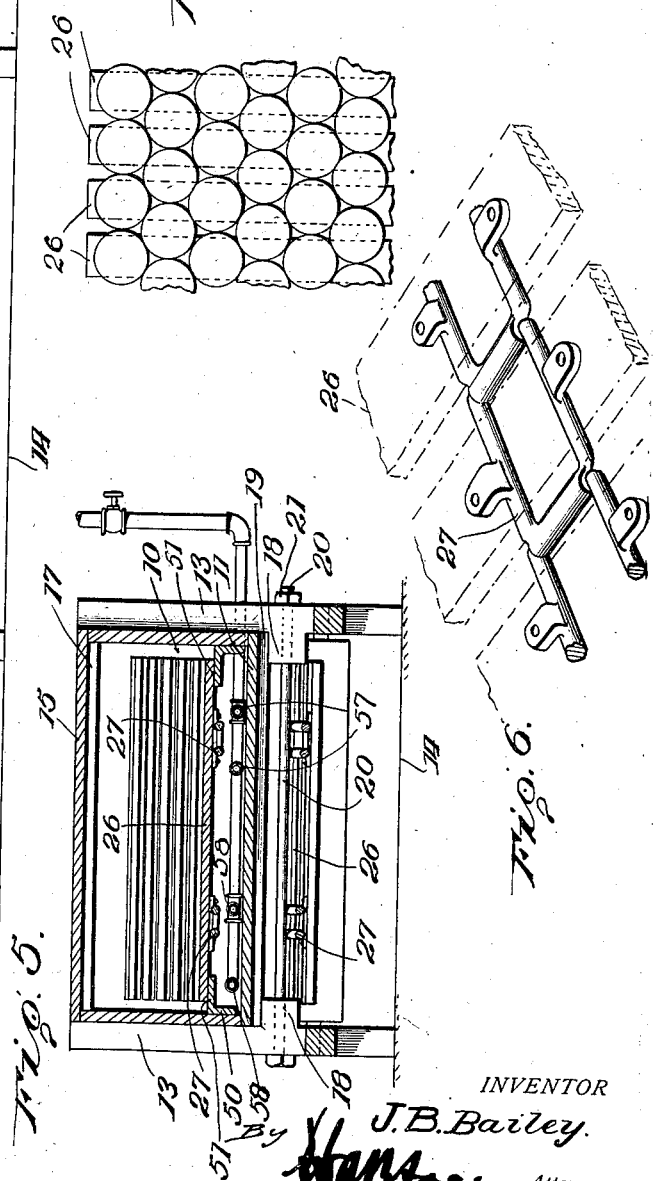
WITNESSES
INVENTOR
J. B. Bailey.
By
Attorneys

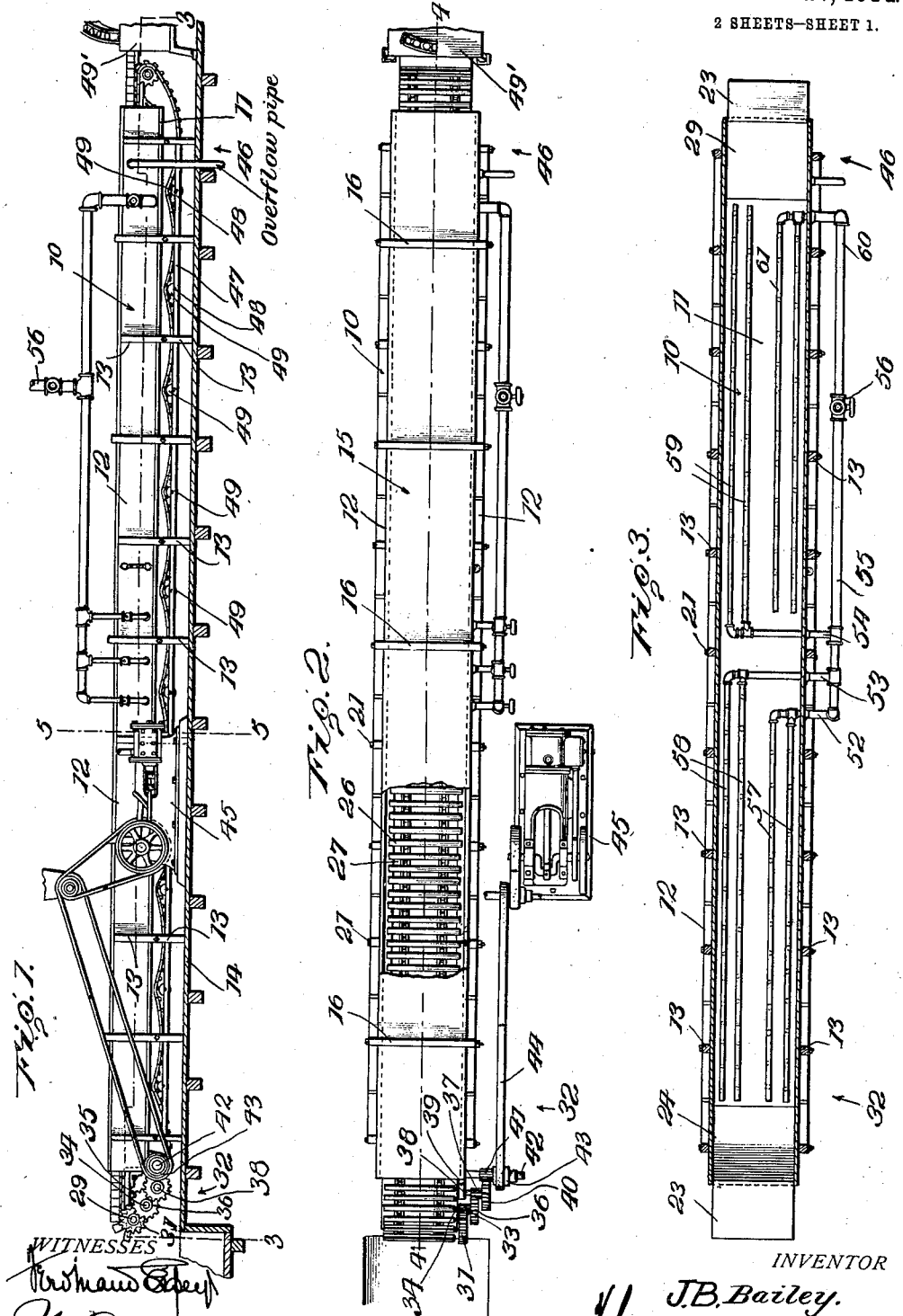

UNITED STATES PATENT OFFICE.

JOHN B. BAILEY, OF FOREST HILL, MARYLAND.

APPARATUS FOR COOKING FRUITS AND VEGETABLES.

1,085,521.  Specification of Letters Patent.  Patented Jan. 27, 1914.

Application filed October 22, 1912. Serial No. 727,261.

*To all whom it may concern:*

Be it known that I, JOHN B. BAILEY, a citizen of the United States, residing at Forest Hill, in the county of Harford and State of Maryland, have invented certain new and useful Improvements in Apparatus for Cooking Fruits and Vegetables, of which the following is a specification.

This invention relates to an improvement in an apparatus for cooking fruits and vegetables.

The primary object of the invention is to provide a mechanism of this character which will receive the cans from the seaming mechanism and convey them through a heated receptacle, the contents of the cans being cooked during their passage through the receptacle, the construction being such that the cans are supported against displacement during their passage through the cooking receptacle.

A further object of the invention is to improve the construction of the receptacle or tank frame and provide a supporting structure which while comparatively light and readily assembled will effectually support the conveyer and the load carried by the same on its passage through the tank.

Another object of the invention is to provide a conveyer guiding mechanism which will properly direct the movement of the conveyer through the tank and which will prevent the same from coming in contact with the adjacent heating apparatus.

A further object of the invention is to provide a heating apparatus which will heat the entire tank, the cans in their travel through the tank being subjected to jets of steam the volume of which is equal throughout the entire length of the tank.

In the drawings: Figure 1 is a side elevation; Fig. 2 is a top plan view of a portion of the top of the tank, being broken away; Fig. 3 is a section on the line 3—3 of Fig. 1, illustrating the arrangement of the heating means; Fig. 4 is a longitudinal section taken on the line 4—4 of Fig. 2; Fig. 5 a transverse section; Fig. 6 a perspective view of one of the sprocket chains of the conveyer, the slats being shown in dotted lines; and Fig. 7 a view illustrating the manner in which the cans are placed upon the conveyer.

In the drawings 10 designates a trough or tank which consists of the bottom 11 to which are secured in sections the side walls 12. Standards 13 support the tank, the bottom of the tank being raised from the floor 14. These standards are disposed in spaced relation and alternate standards extend beyond the side walls of the tank. The top 15 is formed in sections which are of the same length as the distance between the more extensive standards, the more extensive standards being connected by the transverse beams 16 which overlie the meeting edges of the sections which constitute the top. The top sections 15 are formed with batten strips 17 which extend within the tank and provide a snug joint. The transverse beams hold the top sections against displacement, the beams being secured to the vertical standards in such a manner that they may be moved should it be necessary to remove one of the top sections to have access to the interior of the tank at any particular point. Certain of the standards are provided at a point below the bottom with the extension 18 disposed at right angles to the body portion of the standard, the extension of one standard alining with an extension of an opposite standard. Filler strips 19 rest upon these enlargements, the filler strips spacing the standards. A rod 20 passes through the enlargement, said rod being threaded to receive a nut 21, the nut being tightened to draw the standards together to tighten the frame, the filler strips taking up the strain occasioned by the tightening of the rod if the same is tightened to a point where the standard will have a tendency to warp the bottom of the tank or force the side walls inward. It will be noted by this construction that the supporting members of the tank may be effectually tightened to afford a rigid construction without affecting the tank, or disarranging any of its sections. The tank is open at both ends, plates 21 partially closing the open ends. A bracket 22 is secured to each of these plates, said brackets supporting the table 23 over which the conveyer, which will be hereinafter described, passes. Inclined plates 24 extend from each of the tables to a point within the tank, the inclined plates supporting the conveyer mechanism.

The conveyer consists of a plurality of slats 26 which are of a width slightly less than the width of the tank, the links 27 of a sprocket chain being secured to the under face of the slats. The tables 23 support brackets 28, a shaft 29 being supported by the brackets of each table. A plurality of sprocket wheels 30 are mounted upon each of said shafts, the sprocket chain being engaged by said sprockets. A pinion 31 is mounted on the shaft 29 at the delivery end 32 of the conveyer. This pinion meshes with a pinion 33 mounted on the shaft 34 which is supported by a bracket 35 secured to the under face of the table 23. A gear 36 is mounted on this shaft, said gear meshing with the pinion 37 mounted on the shaft 38 which is supported by the bearing 39, the bearing 39 being supported at the end of the tank. A gear 40 is arranged on the shaft 38, said gear meshing with the pinion 41 mounted on the shaft 42. A sheave 43 is mounted on this shaft, said sheave being driven by the belt 44. This belt is driven by the steam engine 45, the steam supply for said engine also furnishing the steam for heating the tank. By the train of gears described, it will be noted that the conveyer will be driven, traveling from the receiving end 46 to the delivery end 32. The standards 13 support longitudinal strips 47 at each side of the tank at a point between the floor and the bottom of the tank, said strips forming bearings for the trunnions 48 of the idler rollers 49 over which the conveyer passes during its travel outside of the tank. It will be noted by this construction that the conveyer will be effectually supported during its return or idle travel.

The seamer 49' is disposed at the receiving end 46 of the conveyer, the cans being placed upon the conveyer as shown in Fig. 7. The slats of the conveyer rest upon angle bars 50 which are secured to the side walls of the tank, the angle bars 50 supporting the conveyer during its travel through the tank. The bearing surfaces 51 of the angle bars are spaced from the bottom of the tank. At a central point longitudinally of the tank a plurality of steam conduits 52, 53 and 54 extend within the tank, steam being supplied by the main conduit 55, the branch pipe 56 of said conduit being connected to the boiler supply of the steam engine 45. The pipe 52 is provided with a plurality of perforated sprayer pipes 57 which extend to a point adjacent the delivery end of the conveyer. The pipe 53 is provided with a similar pair of sprayer pipes, there being a set of player pipes at each side of the tank. A plurality of sprayer pipes 59 extend from the pipe 54, said pipes 59 extending toward the receiving end of the conveyer. The conduit 55 is connected to a pipe 60 which extends within the tank, said pipe being provided with a plurality of spraying pipes 61 extending parallel with the pipes 59 and disposed at the opposite side of the tank. By this construction it will be noted that four sets of sprayer pipes are provided, which extend the entire length of the tank adjacent the side walls. These pipes receive steam from the main conduit 55, the steam being sprayed on the cans during their travel through the tank. The condensation from this steam emerses the cans and thoroughly heats the same.

It will be noted by this construction that the cans in transit through the tank will be subjected to approximately the same temperature throughout the length of the tank, assuring an even heating of their contents.

The many advantages of a construction of this character will be clearly apparent as it will be noted that while the supporting structure is comparatively light and economically manufactured the parts are so connected that a rigid structure is provided.

I claim—

1. A can cooker comprising a tank, a conveyer belt traveling through said tank, standards disposed at spaced intervals throughout the length of the tank, said standards supporting the tank, certain of said standards extending above the tank, transverse bars connecting the more extensive standards of one side with the more extensive standards of the other side of the tank, enlargements formed integral with the standards below the tank, filler strips interposed between the standards and resting upon said enlargements, and a rod passing through the standards and the enlargements, there being means arranged on the rod for drawing the standards together.

2. A can cooker comprising a tank, a conveyer belt supported for travel through said tank, standards disposed at intervals throughout the length of the tank and forming supports for the same, certain of said standards being provided with supporting members which extend beneath the tank, means for drawing the standards of one side toward the standards of the other side, and means for limiting the movement of the standards.

3. A can cooker comprising a tank, a conveyer belt disposed to travel through said tank, standards arranged at intervals throughout the length of the tank, said standards supporting the tank, certain of the standards being provided with enlargements which extend beneath the tank, adjustable means connecting the standards, and means for spacing the inner faces of the standards.

In testimony whereof I affix my signature in presence of two witnesses.

JOHN B. BAILEY. [L. S.]

Witnesses:
WALTER K. ROGERS,
C. C. HANWAY.